United States Patent [19]

Uemura et al.

[11] Patent Number: 4,559,139

[45] Date of Patent: * Dec. 17, 1985

[54] HIGH PERFORMANCE SEMIPERMEABLE COMPOSITE MEMBRANE AND PROCESS FOR PRODUCING THE SAME

[75] Inventors: Tadahiro Uemura, Kyoto; Masaru Kurihara, Otsu, both of Japan

[73] Assignee: Toray Industries, Inc., Tokyo, Japan

[*] Notice: The portion of the term of this patent subsequent to Jun. 7, 2000 has been disclaimed.

[21] Appl. No.: 368,121

[22] Filed: Apr. 14, 1982

Related U.S. Application Data

[63] Continuation-in-part of Ser. No. 358,640, Mar. 16, 1982, abandoned, which is a continuation of Ser. No. 103,369, Dec. 13, 1979, Pat. No. 4,387,024.

[30] Foreign Application Priority Data

Jul. 8, 1981 [JP] Japan ................... 56-122921

[51] Int. Cl.$^4$ ............................................. B01D 31/00
[52] U.S. Cl. ................. 210/490; 210/500.2; 427/245
[58] Field of Search ................ 210/654, 490, 500.2, 210/491; 427/245; 264/41

[56] References Cited

U.S. PATENT DOCUMENTS

| 4,242,208 | 12/1980 | Kawaguchi et al. | 210/654 X |
| 4,244,817 | 1/1981 | Yaginuma | 210/500.2 X |
| 4,387,024 | 6/1983 | Kurihara et al. | 210/500.2 X |

Primary Examiner—Frank Spear
Attorney, Agent, or Firm—Austin R. Miller

[57] ABSTRACT

A high performance semipermeable composite membrane containing a microporous substrate having a semipermeable membrane on the surface thereof. A composite ultrathin solute rejection barrier is formed on an intermediate transport layer which in turn is formed on a substrate.

A mixture of a water soluble organic polymer having reactive amino groups in terminal and/or side chains, together with a monomer or monomeric polyamine is reacted with an agent having a polyfunctional group.

37 Claims, 4 Drawing Figures

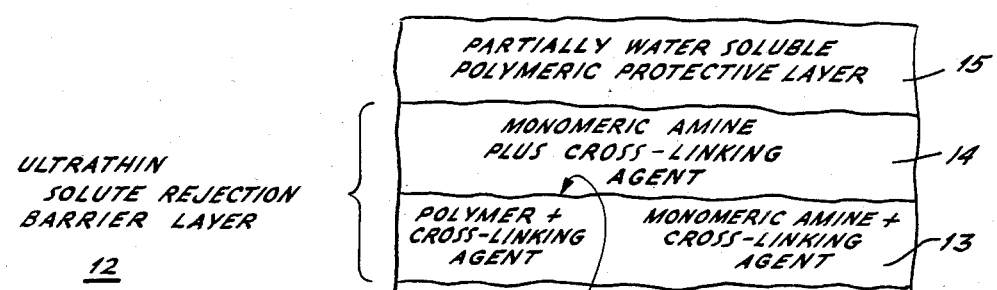
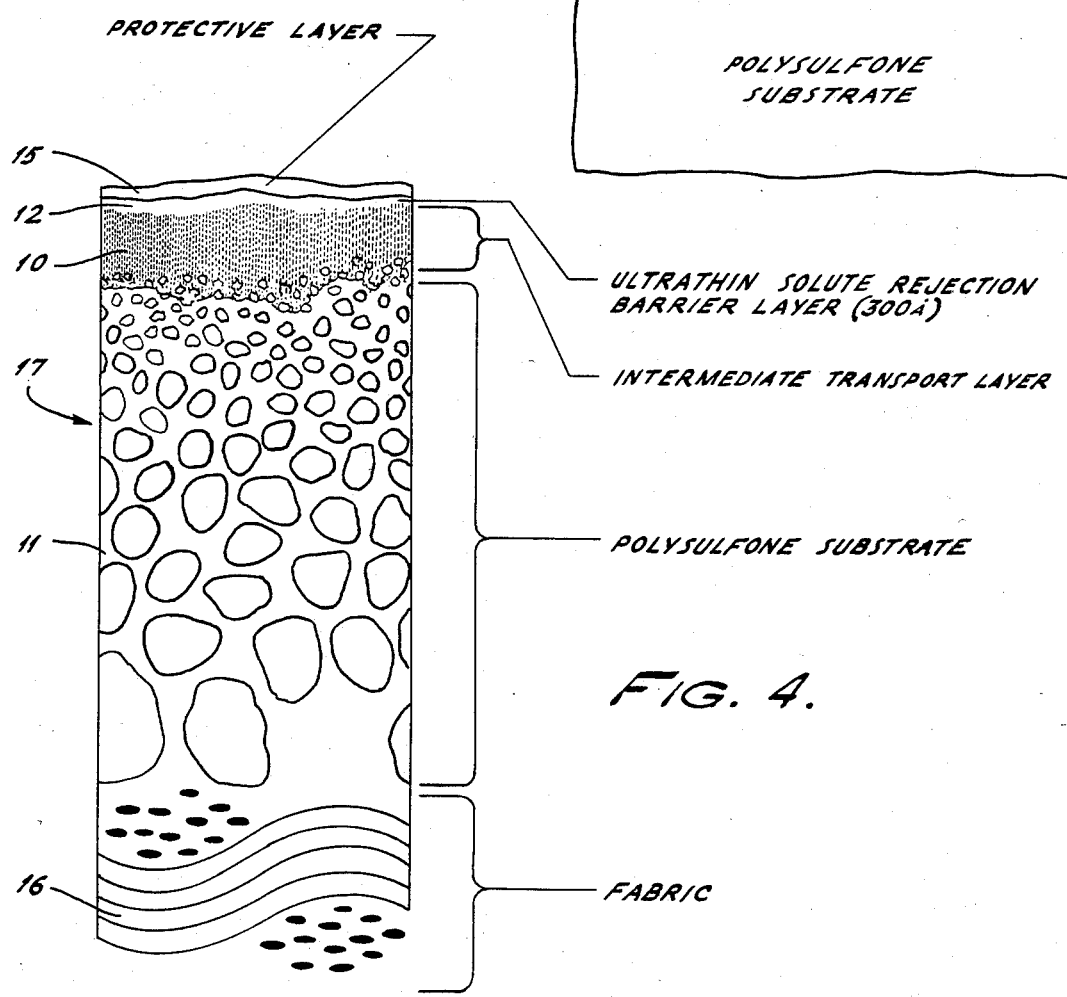

HIGH PERFORMANCE SEMIPERMEABLE COMPOSITE MEMBRANE AND PROCESS FOR PRODUCING THE SAME

This is a continuation-in-part application of a copending continuation application Ser. No. 358,640, filed Mar. 16, 1982 (now abandoned), in turn, a continuation of its copending application Ser. No. 103,369 filed Dec. 13, 1979, now U.S. Pat. No. 4,387,024 granted June 7, 1983.

This invention relates to a high performance membrane and to a process for producing the same, and relates particularly to a novel and highly advantageous semipermeable composite membrane having a high percentage solute rejection and which is especially useful for production of pure water from seawater, which is useful for recovery of valuable materials, and which has excellent resistance to degradation in the presence of chlorine.

BACKGROUND OF THE INVENTION

In recent years liquid separation and purification systems utilizing reverse osmosis have been applied in many fields such as the desalination of seawater or other saline waters and in the recovery of valuable materials from waste liquids of various types.

Various semipermeable membranes are now being used in commercial reverse osmosis treatment of aqueous solutions, either for water purification or for concentration of liquid solutions, or both. Such semipermeable membranes include the early Loeb type membranes made of cellulose acetate by processes as described in U.S. Pat. Nos. 3,133,132 and 3,133,137. The Loeb type membranes are assymmetric types and are characterized by a very thin, dense surface layer or skin that is supported upon an integrally attached, thicker supporting layer. However, the cellulose acetate Loeb type membranes are restricted as to use and as to processability, largely because the membranes must be kept wet at all times; their effectiveness as reverse osmosis membranes is lost once the membranes are dried.

These membranes have also exhibited deficiencies such as alkaline or acidic degradation and biological degradations which result in short life. Furthermore, these membranes are not used widely in separation or recovery of valuable materials from liquid mixtures containing organic chemicals, because the membranes have low selectivity for valuable organic materials and poor resistance to the effects of organic solvents.

Other Loeb type membranes which are also used include membranes fabricated from polyamides (please refer to U.S. Pat. No. 3,567,632 for example), polyamide hydrazide, polyamide acid (Japanese Patent Publication No. 50-121,168), crosslinked polyamide (Japanese Patent Publication No. 52-152,879), polyimidazopyron, polybenzimidazol, polysulfonamide, polybenzimidazoron, polyaryleneoxide, polyvinylmethylether, polyacrylonitrile, polyvinylalcohol, polyhydroxyethylmethacrylate, and polyvinylidenechloride, etc. However, the separation performance and the resistances to chemical degradation of these Loeb type membranes are all inferior to those of the cellulose acetate membranes.

When utilizing the semipermeable membranes in the treatment of saline water, particularly the treatment of seawater, it is often necessary to treat the feed water with chlorine, formalin or other disinfectants so as to guard against bacterial growth, which could greatly deter the performance of the membranes as a result of fouling or the like. But these synthetic membranes have poor durability when exposed to chlorine, which quickly causes a chemical degradation of the membranes and shortens their useful life, accompanied by very low salt rejection, which results in inefficient operation.

In a later development, processes have been provided for preparing an ultrathin film or skin separately from a porous support layer.

Membranes so prepared have become known as composite membranes. In preparing such membranes it is possible to tailor both the ultrathin film and the porous supporting layer in such a manner that each component possesses the most desirable properties. Processes for preparing composite membranes are described in U.S. Pat. Nos. 4,277,344, 4,039,440, 4,005,012, 3,744,642 and 3,926,798 and in Publication Board Reports Nos. 234,198 and 248,670 published by the National Technical Information Service, U.S. Department of Commerce.

Generally, these composite membranes have also exhibited deficiencies such as compaction resulting in short life, as well as undesirably low flux or solute rejection, having no durability to chlorine, formalin or other disinfectants, all resulting in insufficient operation.

SUMMARY OF THE INVENTION

It is an object of this invention to provide a semipermeable composite reverse osmosis membrane which provides excellent solute rejection and has excellent resistance to chlorine and formalin. Another object of this invention is to provide a composite membrane which is not only capable of producing pure water from seawater but is useful for the recovery of valuable materials from the waste water as well. A further object of this invention is to provide a method for making such a composite membrane which can be produced in simple steps which leads itself favorably to commercial production.

Yet another object is to provide a method of controlling membrane thickness of an ultrathin membrane to thereby provide membranes of predetermined thickness ideally adaptable for usage in a wide variety of pressure conditions in service.

Other objects and advantages of this invention will appear in further detail hereinafter.

BRIEF DESCRIPTION OF THE DRAWINGS

FIG. 3 is a schematic cross-sectional drawing, highly enlarged, showing further details regarding the nature of the ultrathin solution barrier layer and the manner in which it is formed.

FIG. 4 is a schematic drawing similar to FIG. 1, but on a less enlarged scale showing a barrier of the present invention in combination with a polysulfone substrate and a fabric.

DETAILED DESCRIPTION OF THE INVENTION

Figure 1:
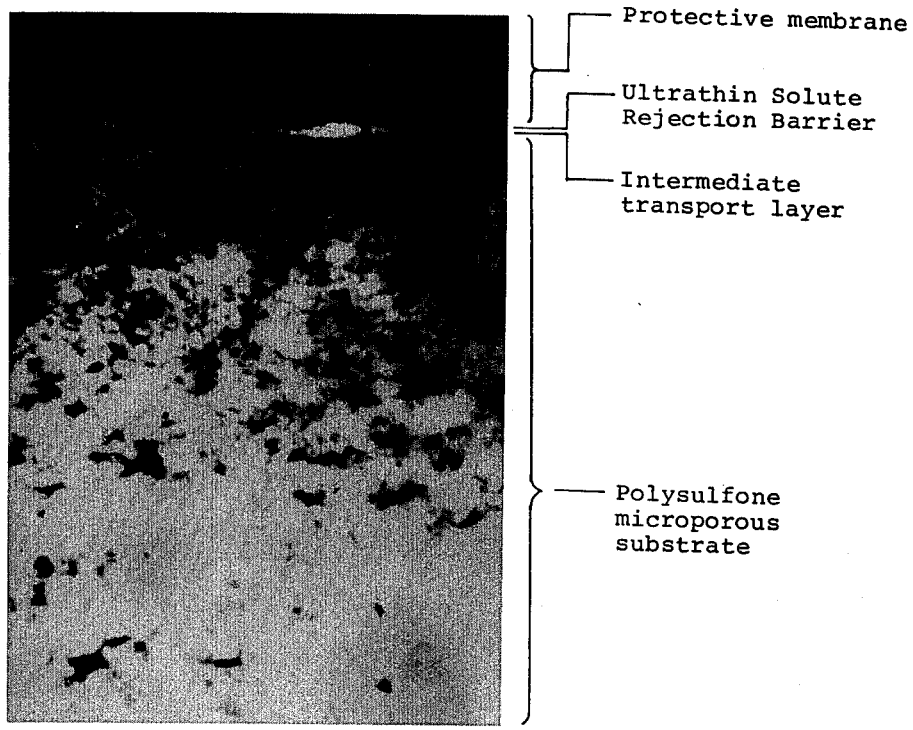
FIG. 1 is an electron microphotograph showing the fine structure of an ultrathin cross-section of a semipermeable composite membrane in accordance with this invention.

In accordance with this invention, a semipermeable composite membrane is provided comprising a microporous substrate, an intermediate transport layer and an ultrathin solute barrier layer formed on a surface of the microporous substrate. The ultrathin solute barrier layer comprising an inner portion and an outer portion is composed of a crosslinked polymer made by reacting (a) a mixture containing a water-soluble polymer having reactive groups selected from amino and hydroxyl groups, said mixture also containing a monomer, with (b) a crosslinking agent having acylhalide groups capable of reacting with the reactive groups of the water-soluble polymer and also of reacting with the amino groups of the monomer contained in the mixture (a). The solution containing mixture (a) and the solution containing (b) are essentially immiscible with one another whereby interfacial polymerization takes place among the water-soluble polymer, monomer, and the crosslinking agent to form an inner portion of ultrathin layer. At the same time, some monomer migrates through the inner portion of ultrathin layer and polymerizes with the crosslinking agent to form a crosslinked polymeric outer portion of ultrathin layer on the aforementioned inner portion of ultrathin layer.

By causing the polymerization in such an interfacial manner, the resulting polymer forms an ultrathin solute rejection barrier layer of surprising uniformity with respect to thickness. Further, by predetermining the amount and type of monomer present in the aqueous solution, the amount penetrating through the aforesaid inner portion of ultrathin barrier is also determined, and this predetermines the thickness of the outer portion of ultrathin barrier layer that will be produced from polymerization of the monomer with the crosslinking agent. In this surprising and highly effective manner, the overall thickness of the ultrathin solute rejection barrier layer can be accurately predicted and the uniformity of thickness of the resulting barrier is entirely unprecedented.

Thickness control is highly important because solute rejection barriers are utilized under various pressures in different fields of service. Where low values of solute rejection are sufficient, very thin barriers (100 Å or less) may be used at low pressures. On the other hand, barriers as thick at 100 Å or more may be provided in accordance with this invention, and these may be used under very high pressure with adequate solute rejection performance.

Examples of water-soluble polymers which are useful in the practice of this invention include amine modified polyepihalohydrin, polyethyleneimine, polyepiaminohydrin and polyvinylalcohol, preferably, water-soluble reaction products which are modified by reacting a polyepihalohydrin represented by the following formula (I) with an amine compound (II):

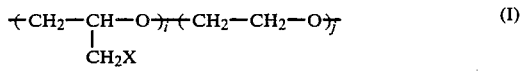

wherein X is a halogen atom such as Cl, Br or I, and i and j are mole fractions which satisfy the following relations:

$i+j=1$ $0<i\leq 1$ $0\leq j<0.8$

The amine compound (II) which is to be reacted with a polyepihalohydrin (I) is a non-cyclic or cyclic polyamine containing:
(1) from 0 to 1 amino group,
(2) more than 1 imino group, and
(3) the sum of the amino groups and the imino group(s) is more than 2, wherein the amino group when present is bonded to a carbon atom and the imino groups are bonded to a carbon atom or to two different carbon atoms, the total number of carbon atoms being from 3 to 12.

The monomer which is used with the water-soluble polymer in the practice of this invention preferably fulfills the following requirements:

It is an aromatic polyamine containing at least 2 amino groups on an aromatic compound comprising of 1 to 3 aromatic rings.

Examples of polyepihalohydrins represented by formula (I) include polyepichlorohydrin, polyepibromohydrin and polyepiiodohydrin. Examples of the monomer include phenylenediamine, diaminodiphenylether, diaminodiphenylsulfone, diaminodiphenylmethane, tetraaminodiphenylmethane, more preferablly m-phenylenediamine.

These polyepihalohydrins (I) may be modified by reacting them with amine compounds (II) according to the procedure well known in prior arts, for example as described in U.S. Pat. No. 4,056,510. Examples of the amine compound (II) being reacted with the polyepihalohydrins (I) are monomeric polyamine such as 4-(aminomethyl)piperidine, ethylenediamine, diaminopropane, diaminobutane, diaminopentane, diethylenetriamine, dipropylenetriamine, triethlenetriamine, pentaethlenehexamine and the like, preferablly 4-(aminomethyl)piperidine.

The mixture used for preparing the composite membrane of this invention is obtained by mixing the monomer and the polymer having amino groups or hydroxyl groups. However, an amine modified polyepihalohydrin containing excess monomeric polyamine may be used to obtain a membrane having a wide variety of performance.

The mix ratio of the polymer with the monomer is about 10% to 90% by weight of monomer in 90% to 10% by weight of polymer, preferably from 20% to 85% by weight of polymer and about 80% to 15% by weight of monomer. When the mix ratio is substantially outside the 90%–10% ratio, the resulting composite membrane shows lower solute rejection or lower flux.

As will be described hereinafter, the semipermeable composite membrane of this invention comprises two crosslinked polymers, the ultrathin solute barrier is obtained by reacting the mixture with a crosslinking agent and the intermediate transport layer is obtained by heat crosslinking of the water-soluble polymer. Semipermeable composite membranes obtained from the crosslinked polymers have the fine structure of a two phase system, that is, an ultrathin solute barrier layer and an intermediate transport layer.

It is considered that the ultrathin solute barrier layer determines the solute rejection or permeability of the composite membrane, and that the intermediate transport layer is the layer adhering the ultrathin solute barrier to the microporous substrate.

When a membrane is prepared by using only the monomer and/or the monomeric polyamine, a fine structure attributable to the use of a two phase system does not form in the resulting semipermeable membrane, and the composite membrane does not have good separation performance. On the other hand, when a membrane is prepared by using only the water-soluble polymer having amino groups or hydroxyl groups (without the monomer or the monomeric polyamine), the membrane formed does have the fine structure of a two phase system, but the liquid separation performance of the resulting composite membrane is poor. Further, such membranes tend to deteriorate with time, because the solute barrier layer of the semipermeable membrane is very thin and is prone to mechanical damage.

The thickness of the ultrathin solute barrier layer and the intermediate transport layer of the membrane may be controlled in a highly effective manner by altering the mix ratio of the monomer to the water-soluble polymer. The performance of the composite membrane can be controlled to some degree by altering the thickness of the ultrathin solute barrier layer and the intermediate transport layer. The thickness of the ultrathin solute barrier layer is preferably within the range of 100 Å to about 1000 Å, more preferably from about 150 Å to 500 Å, and the thickness of the intermediate transport layer is preferably in the range of about 100 Å to 3 microns, more preferably about 100 Å to about 2 microns. When the ultrathin solute barrier layer is less than about 100 Å in thickness, the composite membrane is prone to mechanical damage, and it is difficult to retain the separation performance of the membrane.

On the other hand, when the ultrathin solute barrier layer is thicker than about 1,000 Å, the liquid permeation of the composite membrane decreases. Furthermore, when the thickness of the intermediate transport layer is outside the above range, the composite membrane has reduced liquid separation performance or undergoes a performance change, because the thickness of the intermediate transport layer is somewhat prone to unevenness and irregularity of the surface of the microporous substrate.

The sum of the thicknesses of the ultrathin solute barrier layer and the intermediate transport layer is preferably about 150 Å to about 3 microns.

FIG. 1 is an electron microphotograph showing the fine structure of an ultrathin cross section of a semipermeable composite membrane comprising one example in accordance with this invention.

This figure clearly indicates the fine structure of the membrane surface as examined with the aid of an electron microscope. The membrane surface was shadowed with Pt—Pd and carbon in a vacuum-depositing apparatus. The membrane was embedded with with an epoxy resin, dyed with an $OsO_4$ solution and was sectioned by using an ultramicrotome with a diamond knife. The ultrathin membrane layer of approximately 300 Å thickness and the intermediate transport layer of about 200 Å thickness were examined by a Hitachi HU-12 Transmission Electron Microscope.

Figure 2:
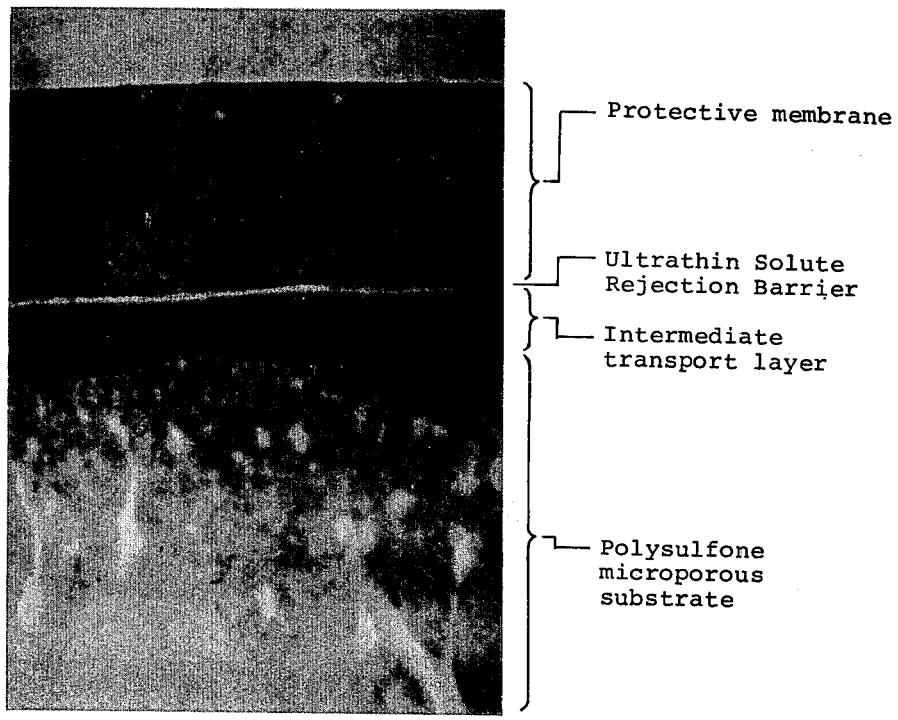
FIG. 2 is an electron microphotograph similar to FIG. 1 showing the fine structure of an ultrathin cross-section of a semipermeable composite membrane obtained by using a solution containing only the amine modified polyepihalohydrin.

FIG. 2 is an electron microphotograph similar to FIG. 1 showing the fine structure of an ultrathin cross-section of a semipermeable composite membrane obtained by using a solution containing only the amine modified polyepihalohydrin. FIG. 2 clearly shows that the ultrathin membrane layer is approximately 100 Å in this case. The magnifications of the microphotographs of FIGS. 1 and 2 are about 90,000 times for each. The microphotographs show that the ultrathin solute barrier layer of the membrane of FIG. 1 is significantly thicker than the ultrathin solute barrier layer of FIG. 2.

FIG. 3 is a schematic cross-sectional drawing, greatly enlarged, showing further details regarding the nature of the ultrathin solute barrier layer and the manner in which it is formed.

FIG. 4 is a schematic drawing similar to FIG. 1 but on a less enlarged scale, showing a barrier of this invention in combination with a polysulfone substrate and a fabric.

The interfacial polycondensation method, itself well known, is used for fabrication of the semipermeable composite membranes of this invention. The method has been described in great detail by P. W. Morgan in "Condensation Polymers by Interfacial and Solution Methods", Intersciences Publishes, New York, 1965.

According to this method, the aqueous mixture of the water-soluble polymer having the reactive groups selected from amino and hydroxyl groups and the monomer is coated on a surface of the microporous substrate; thereafter the hydrophobic solution containing crosslinking agents whose acylhalide groups are capable of reacting with the amino groups or hydroxyl groups is coated upon but does not mix with the aqueous solution and forms a separate layer thereon. In situ interfacial polycondensation on the microporous substrate takes place between the immiscible solutions and produces an ultrathin surface coating possessing solute barrier characteristics.

Examples of a crosslinking agent useful in the practice of this invention are selected from the group consisting of the acid chloride such as trimesoylchloride, trimellitic acid chloride etc. They are dissolved in suitable solvents which are substantially immiscible with water, such as hexane, heptane, pentane, benzene, carbon tetrachloride, trifluorotrichloroethane, etc.

The microporous substrate may be formed as a flat sheet or as a tubular or hollow fibers, or any other desired shape usually used for reverse osmosis separation processes, and the pores in the surface are preferably sized between about 10 Å and about 300 Å. The pores tend to become gradually enlarged toward the back (supporting substrate) side. The aforementioned microporous substrate may be distinguished as an anisotropic membrane made from homopolymers or from blended polymers of polysulfone, chlorinated polyethylene, polyvinylchloride, celluloseacetate, cellulosenitrate, etc. The most preferable material is polysulfone. Preparation of a polysulfone substrate is described in "Office of Saline Water Research and Development Progress Report" No 359, Oct., 1968.

The aforementioned two phase system semipermeable membranes of this invention, composed of an ultrathin solute barrier layer and an intermediate transport layer can be obtained by using an aqueous solution containing the water-soluble polymer having reactive groups selected from amino and hydroxyl groups and the monomer, in which the concentration of the aforementioned polymer is preferably from about 0.1% to 10% by weight, more preferably from 0.5% to 5% by weight. The concentration of the monomer is preferably within the range of about 0.1% to 10% by weight, more preferably about 0.5% to 5% by weight. As the result of these concentrations, a two-phase system having the desired thickness is readily and conveniently obtained. From these a composite membrane possessing excellent separation characteristics can be fabricated with good yield. By simply increasing monomer content in the solution, the thickness of the resulting ultrathin barrier may also be increased.

The water-soluble polymer having the reactive groups selected from amino and hydroxyl groups and the monomer in the aqueous solution are converted to a water-insoluble crosslinked polymer made by interfacial reaction with the crosslinking agent contained in the hydrophilic phase. For this reaction one of a number of alkaline reagents, such as sodium hydroxide, potassium hydroxide, sodium carbonate, sodium bicarbonate, etc., may be added to remove by-products of the reaction, such as hydrogen chloride, etc. Further, catalysts such as crown ethers may be used for acceleration of the crosslinking agent in the water immiscible solution is affected by the concentration of the water-soluble polymer having amino or hydroxyl groups and the monomer in the aqueous phase. The preferable concentration is between about 0.1% to 10% by weight.

The microporous substrate covered with the ultrathin solute barrier layer, formed by the interfacial condensation reaction, is cured at a high temperature, which should not be so high as to break the microporous substrate. The temperature is preferably between 80° C. and 150° C. As a result of this curing, the intermediate transport layer of water-soluble polymer of the aqueous phase becomes water-insoluble, forming an intermediate transport layer between the ultrathin solute barrier layer and the substrate. The semipermeable ultrathin composite membrane becomes stabilized as to durability and separation characteristics. The ultrathin solute barrier layer is formed by an interfacial condensation between the mixture of water-soluble polymer having the group selected from amino and hydroxyl groups and the monomer, and the crosslinking agent.

When the water-soluble polymer having the reactive group selected from amino and hydroxyl groups is the only species in the water solution, the ultrathin solute barrier layer formed in the same manner is not more than about 100 Å in thickness. On the other hand, when the monomer is the only species present, the ultrathin solute barrier layer attains a thickness of only a few microns as a maximum. Accordingly, the resulting semipermeable composite membranes are of only very limited use in either case.

In contemplating the nature of the interfacial reaction, and in considering the monomer size, and the reactivity of the monomer and of the water-soluble polymer having amino or hydroxyl groups, the inner portion of ultrathin solute barrier layer may be formed immediately after contact with the crosslinking agent, accompanied or followed by diffusion of the monomer only through the inner portion of ultrathin solute barrier layer. Having penetrated the inner portion of ultrathin layer, the monomer reacts with the crosslinking agent contained in the hydrophobic phase and thus forms additional polymer which is deposited upon the inner portion of ultrathin solute barrier layer and increases its thickness accordingly.

Because of this phenomenon, the resulting thickness of the ultrathin solute barrier layer of this invention is greater than in the case of using only the water-soluble polymer having amino groups or hydroxyl groups. Also, such layer is thinner and more uniform than one produced by the use of monomer only.

The protective layer later applied to the ultrathin solute barrier layer causes the composite membrane to be much more stable against mechanical shocks. Water-soluble organic polymers such as polyvinylalcohol (PVA), polyvinylpyrrolidiene, polyacrylamide and polyacrylic acid, for example, are useful in forming the protective layer. Addition of a polyfunctional halogenated compound to this water solution is sometimes useful for crosslinking the protective layer, resulting in good water resistance. The remaining polyfunctional reagents of the interfacial polycondensation on the ultrathin solute barrier layer are also useful for crosslinking the protective layer. The optimum thickness of the protective layer is about 0.1 micron to 20 microns when PVA is used.

FIG. 3 of the drawings shows diagrammatically and greatly magnified a typical structure obtained according to this invention. The intermediate transport layer 10 is composed of a water-insoluble polymer formed from the water-soluble polymer of the aqueous layer which remains in place on the polysulfone substrate 11 and which was solidified and rendered water-insoluble by heating. Next to the intermediate transport layer 10 is the composite ultrathin solute rejection barrier 12; its inner layer 13 is formed by reaction of the water-soluble polymer plus the monomer with the crosslinking agent: a crosslinked product of all three. During these reactions the monomer also migrates in the direction of the arrow in FIG. 3 from the aqueous phase through the barrier layer 13 forms at the interface, and reacts with the crosslinking agent of the organic phase, producing the outer layer 14 of the ultrathin solute rejection barrier. This outer layer 14 is the crosslinked product of the monomer with the crosslinking agent. The number 15 designates the outer protective layer preferably subsequently applied.

FIG. 4 shows the polysulfone substrate 11 supported by a fabric 16. This figure also shows the typically irregular surface 17 of the polysulfone substrate 11, which is difficult to coat thickly with any uniformity. The intermediate transport layer 10 admirably compensates for this surface roughness and securely attaches itself to the polysulfone layer while also providing an excellent, much more uniform supporting surface for the ultrathin solute barrier layer 12. In this manner thickness variations of the layer 12 are minimized. For example, in a typical case a layer 12 may be provided with a maximum thickness of 500 Å and a minimum thickness of 200 Å, which is highly significant in terms of barrier performances.

The following specific examples have been selected as illustrative of various ways in which this invention may be practiced. They are not intended to define or to limit the scope of the invention, which is set forth in the appended claims.

In the examples which follow, solute rejection (%) and flux (m$^3$/m$^2$day) are calculated as follows:

$$\text{solute rejection (\%)} = (C_1 - C_3)/C_1 \times 100$$

Wherein
$C_1$ is the solute concentration in feed and
$C_3$ is the solute concentration in the permeate. flux (m$^3$/m$^2$day) = Q/S
wherein Q is the quantity of solvent passing through the membrane per day (m$^3$/day), and
S is the active membrane surface (m$^2$).

EXAMPLE 1

A polyester woven fabric (taffeta) having a warp density of 90/inch and a weft density of 67/inch, and having a thickness 160 micron, woven by using 150 denier mulchfilament 20 cm by 30 cm, was set on a glass plate. A dimethylformamide (DMF) solution containing 16% polysulfone (Union Carbide Co. Ltd. Udel P-3500) was cast upon the glass plate at about 200 micron thickness, at room temperature (20° C.). Immediately the product was immersed into water containing 0.5% by weight of sodium dodecyl sulphate at room temperature for 5 minutes. The product was then washed for 1 hour, using pure water.

The resulting fiber reinforced polysulfone substrate (FR-PS) had about 210 micron thickness and had a pure water permeability of 0.005 to 0.001 g/cm$^2$sec.atm. under conditions of 1 Kg/cm$^2$ driving pressure and a feed temperature of 25° C.

From analysis by electron microscope photographs, the FR-PS possessed 600 pores per square micron, and each of the pores was between 100 to 500 Å in diameter.

120 grams of sodium iodide were dissolved in 80 grams of hot methylethylketone. To this, 92.5 grams of polyepichlorohydrin dissolved in 200 grams of methylethylketone were added, and the product was stirred at the boiling temperature for 25 hours. The resulting solution was cooled to room temperature, filtered and 3000 grams of water were added. The precipitated polymer was washed in 500 grams of methanol and dried in vacuum at 50° C. for 10 hours to obtain a polyepiiodohydrin. 80% of the chloro groups were found to be changed to iodo groups from chemical analysis. 12 grams of polyepiiodohydrin were dissolved in 100 grams of tetrahydrofuran and 10 grams of water and 35 grams of 4-(aminomethyl)piperidine were added. After stirring at 35° C. for 6 hours, sulfuric acid was added dropwise to neutralize the resultant solution. 300 grams of methanol were added to the resulting solution, and a white precipitate was obtained. This precipitate was purified by use of four reprecipitations, each from a methanol and water solution (methanol/water=3/1). The product was then passed through an anionic ion exchange resin bed to remove the sulfric acid base, and the polymeric substance was obtained. Using infrared spectrum analysis and $^{13}$C nuclear magnetic resonance, this polymer was found to be 4-(aminomethyl)piperidine modified with polyepiiodohydrin (polyaminoether).

This polymer was stored in a refrigerator as a water solution. A water solution containing 1.0 wt% of the polyaminoether obtained above, 1.2 wt% of m-phenylenediamine and 0.12 wt% of 4-(aminomethyl)-piperidine and a trichlorotrifluoroethane solution containing 0.05 wt% of trimesoylchloride were prepared.

The water solution was poured on a flat surface of a polysulfone microporous substrate, which was then placed in a vertical position for 30 seconds to drain off the excess solution. After this, the trichlorotrifluoroethane-trimesoylchloride solution was also poured on the substrate and on top of the aqueous solution, causing interfacial polymerization to occur. After 30 seconds, the excess solution drained in the same manner for 1 minute.

The membrane was then cured in a convection oven at 120° C. for 10 minutes, crosslinking the water soluble polyaminoether to result in the formation of the intermediate transport layer. It was cooled at room temperature, and covered by 1 wt% polyvinylalcohol solution. Excess solution was drained off while maintaining the membrane in a vertical position. The membrane was finally cured at 110° C. in an oven for 10 minutes. The reverse osmosis performance of the resulting composite membrane was measured under the following conditions:

Pressure: 56 Kg/cm$^2$
Feed solution: 3.5% NaCl aqueous solution
Temperature: 25° C.

The composite membrane showed 99.4% salt rejection and 0.54 m$^3$/m$^2$day water flux.

EXAMPLE 2

The microporous polysulfone substrate which was prepared in Example 1 was coated with the aqueous solutions in Example 1 for 2 minutes. The substrate was then placed in a vertical position for 15 seconds to drain off the excess solution. After this the substrate coated with the trichlorotrifluoroethane solution containing 0.05 wt% of trimesoylchloride for 45 seconds. The membrane was cured in a convection oven at 120° C. for 10 minutes after drying it in the air for 1 minute. It was cooled at room temperature, and covered by a 2 wt% polyvinylalcohol solution. The membrane was finally cured at 100° C. for 5 minutes. The reverse osmosis performance of the resulting polyamide composite membrane was measured under the following conditions:

Pressure: 56 Kg/cm$^2$
Feed solution: 3.5% seawater
Temperature: 25° C.
pH: 6.5

The composite membrane showed 99.6% salt rejection and 0.48 m$^3$/m$^2$day water flux.

After dipping the membrane in the 0.5 wt% aqueous formalin solution at room temperature for 96 hours, the membrane showed the performance of 99.4% salt rejection and 0.37 m$^3$/m$^2$day under the same evaluation conditions.

An electron micrograph of the cross-section of the composite membrane shows that this membrane is composed of about 200 Å thickness of intermediate transport layer on the microporous polysulfone substrate, about 300 Å thickness of ultrathin solute barrier layer and protective layer, as shown in FIG. 1.

EXAMPLE 3

The microporous polysulfone substrate was prepared by using a DMF solution containing 12 wt% polysulfone according to the same procedure of Example 1. The preparation of the membrane was otherwise the same as Example 1. The membrane performance of the membrane shows 98.2% salt rejection and 0.69 m$^3$/m$^2$day water flux.

EXAMPLE 4

The composite membrane obtained from Example 1 was tested in the presence of 0.2 ppm chlorine in the feed solution for 2,000 hours under the following conditions;

Pressure: 56 Kg/cm$^2$
Feed solution: 3.5% seawater
Temperature: 25° C.
pH: 6.5

Test results are shown in table 1.

TABLE 1

| Elapsed time (hrs) | Salt rejection (%) | Water flux ($m^3/m^2day$) |
|---|---|---|
| 24 | 99.90 | 0.35 |
| 500 | 99.90 | 0.34 |
| 1,300 | 99.87 | 0.32 |
| 2,000 | 99.85 | 0.30 |

COMPARATIVE EXAMPLE 1 AND 2

The water solution containing 2 wt% of m-phenylenediamine was poured on the microporous polysulfone substrate obtained from Example 1 and Example 3, which was then placed in a vertical position for 30 seconds to drain off the excess solution. After this, the trichlorotrifluoroethane solution containing 0.1 wt% of trimesoylchloride was also poured on the substrate and on a top of the aqueous solution for 30 seconds. The resulting membrane was then dried in air at room temperature. The test results of the reverse osmosis performances are shown in Table 2 under the same conditions of Example 2.

TABLE 2

| Comparative example | Polysulfone substrate | Membrane performances* | |
|---|---|---|---|
| | | untreated | treated** |
| 1 | Example 1 | 99.3–0.65 | 93.0–0.01 |
| 2 | Example 3 | 40.0–1.20 | — |

*(rejection (%)-flux($m^3/m^2$day))
**treated by the 0.5 wt % aqueous formalin solution at room temperature for 96 hours

EXAMPLE 5

Polyethyleneimine was used instead of the amine modified polyepihalohydrin of Example 1. The composite membrane was prepared by the same procedure of Example 1 and tested under the same conditions of Example 1. The test results showed 99.30% salt rejection, and 0.32 $m^3/m^2$day water flux.

EXAMPLES 6 AND COMPARATIVE EXAMPLE 3 TO 4

The composite membranes were prepared by the same procedure of Example 2 or Comparative Example 2, except that the factors shown in the table 3 and the mixture of trimesoylchloride and 0.1 wt% of isophthaloylchloride is used instead of trimesoylchloride. The ratio of trimesoylchloride and the isophthaloylchloride is 1 in weight base. Reverse osmosis performances were tested under the same conditions of Example 2.

TABLE 3

| | Example | Comparative example | |
|---|---|---|---|
| | 6 | 3 | 4 |
| Polyethyleneimine (wt %) | 1.0 | 2.0 | 0.0 |
| m-Phenylenediamine (wt %) | 1.0 | 0.0 | 2.0 |
| Salt rejection (%) | 99.35 | 85.0 | 40.0 |
| Water flux ($m^3/m^2$day) | 0.35 | 0.85 | 1.28 |

EXAMPLE 7

0.2 wt% of polyvinylalcohol and 0.2 wt% of 4-(aminomethyl)piperidine were used instead of amine modified polyepihalohydrin as in Example 2.

The performance of the membrane made from these solutions, prepared as in Example 2, was measured under the same conditions of Example 2. The membranes showed 98.7% salt rejection and 0.42 $m^3/m^2$day water flux.

COMPARATIVE EXAMPLE 5

An aqueous solution containing 2 wt% of amine modified polyepihalohydrin prepared in Example 1 and 0.5 wt% of 4-(aminomethyl)piperidine were prepared. The composite membrane prepared from these solutions and n-hexane solution containing 0.2 wt% isophthaloylchloride as in Example 2 was tested under the same conditions of Example 2. The membrane showed 99.6% salt rejection and 0.35 $m^3/m^2$day water flux. After testing this membrane under the same conditions of Example 4 for 500 hours, the membrane performance changed from the performance above to 98.6% salt rejection and 0.27 $m^3/m^2$day water flux.

We claim:

1. A high performance semipermeable composite memebrane comprising:
   (a) a microporous substrate;
   (b) an intermediate transport layer comprising a cross-linked polymer made from a water soluble polymer, formed upon and affixed to said microporous substrate; and
   (c) an ultrathin solute rejection barrier layer comprising (i) an inner portion affixed to said intermediate transport layer and comprising a crosslinked polymer made from the reaction product of a water soluble polymer and a monomer with a crosslinking agent, and (ii) an outer portion affixed to said inner portion (i) and comprising a crosslinked polymer made from the monomer with the crosslinking agent, wherein said water soluble polymer has a reactive amino or hydroxyl group, said monomer has at least two amino groups on an aromatic nucleus comprising from 1 to 3 aromatic carbon rings, and said crosslinking agent has at least 3 acylhalide groups on an aromatic nucleus comprising from 1 to 3 aromatic carbon rings.

2. The membrane defined in claim 1, wherein said ultrathin solute rejection barrier layer has a controlled and substantially uniform thickness of about 100 to 1,000 A.

3. The membrane defined in claim 1, wherein said water soluble polymer is selected from the group consisting of amine modified polyepihalohydrin, polyethyleneimine, polyepiaminohydrin and polyvinylalcohol.

4. The membrane defined in claim 1, wherein said water soluble polymer is amine modified polyepiaminohydrin.

5. The membrane defined in claim 4, wherein said amine modified polyepihalohydrin is a modified polymer of polyepihalohydrin with a monomeric polyamine.

6. The membrane defined in claim 4, wherein said amine modified polyepihalohydrin is a modified polymer made by reacting at least one polyepihalohydrin represented by the formula (I);

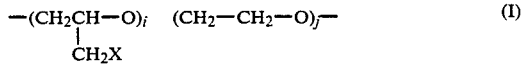

wherein the X is a halogen selected from the group consisting of Cl, Br and I, and i and j are mole fractions and satisfy the following relationships:

$i + j = 1$ $0 < i \leq 1$ $0 \leq j < 0.8$ with at least one monomeric polyamide (ii) which is a non-cyclic or cyclic polyamine containing:
(1) from 0 to 1 amino group,
(2) more than 1 imino group, and
(3) the sum of the amino group and the imino groups is more than 2, wherein the amino group when present is bonded to a carbon atom and to the imino groups are bonded to from one to two carbon atoms, the total number of carbon atoms being from 3 to 12.

7. The membrane defined in claim 6, wherein the monomeric polyamine (II) is 4-(aminomethyl)piperidine.

8. The membrane defined in claim 6, wherein said polyepihalohydrin(I) is selected from the group consisting of polyepichlorohydrin, polyepibromohydrin and polyepiiodohydrin.

9. The membrane defined in claim 1, wherein the monomer is selected from the group consisting of phenylenediamine, diaminodiphenylether, diaminodiphenylsulfone, diaminodiphenylmethane and tetraaminodiphenylmethane.

10. The membrane defined in claim 9, wherein said monomer is phenylenediamine.

11. The membrane defined in claim 9, wherein said monomer is m-phenylenediamine.

12. The membrane defined in claim 1, wherein said crosslinking agent is selected from the group consisting of trimesoylchloride and trimellitic acid chloride.

13. The membrane defined in claim 12, wherein said crosslinking agent is trimesoylchloride.

14. The membrane defined in claim 1, wherein said membrane intermediate transport layer has a thickness of about 100 Å to 3 microns.

15. The membrane defined in claim 1, wherein said ultrathin solute barrier layer is about 100 Å to 1000 Å in thickness and said intermediate transport layer is about 100 Å to 3 microns in thickness.

16. The membrane defined in claim 1, wherein said microporous substrate comprises an organic polymer selected from the group consisting of polysulfone, chlorinated polyolefin, cellulose acetate and polyvinylchloride.

17. The membrane defined in claim 1, wherein the microporous substrate is reinforced by a material selected from the group consisting of calendered woven fabric, calendered non-woven fabric, uncalendered woven fabric, uncalendered non-woven fabric, porous film and paper.

18. The membrane defined in claim 1, wherein the membrane is protected by a crosslinked polymer selected from the group consisting of polyvinyl alcohol, partially saponified polyvinyl acetate, and polyvinyl pyrrolidone.

19. The membrane defined in claim 18, wherein the protective coating has a thickness of about 1000 Å to about 10 microns.

20. A process for producing a high performance semipermeable composite membrane comprising the steps of:
(a) covering the surface of a microporous substrate with an aqueous solution containing at least one water soluble polymer having reactive amino or hydroxyl groups, said aqueous solution also containing a monomer having at least two amino groups on an aromatic compound comprising from 1 to 3 aromatic carbon ring(s);
(b) covering the resulting coated porous substrate with a solution which is substantially immiscible with the solution of step (a) and which contains a crosslinking agent having at least 3 acylhalide groups on an aromatic compound comprising from 1 to 3 aromatic carbon rings capable of undergoing interfacial polymerization with said reactive groups of the water-soluble polymer and with said monomer to form an ultrathin film on said surface of said microporous substrate;
(c) continuing said interfacial polymerization reaction for a time sufficient to cause migration of at least a portion of said aromatic polyamine through an inner portion of the ultrathin film, thereby reacting said aromatic polyamine with said crosslinking agent to form an outer portion of an ultrathin polymeric layer on the inner portion of the ultrathin layer being formed; and
(d) drying the resulting composite semipermeable membrane at an elevated temperature for a time sufficient to cross-link said water-soluble polymer.

21. The process defined in claim 20, wherein said water-soluble polymer is selected from the group consisting of amine modified polyepihalohydrin, polyethyleneimine, polyepiaminohydrin and polyvinylalcohol.

22. The process defined in claim 20, wherein said water-soluble polymer is an amine modified polyepihalohydrin.

23. The process defined in claim 22, wherein said amine modified polyepihalohydrin is a modified polymer of polyepihalohydrin with a monomeric polyamine.

24. The process defined in claim 23, wherein said amine modified polyepihalohydrin is a modified polymer made by reacting at least one polyepihalohydrin represented by the formula (I):

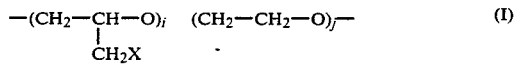
(I)

wherein X is a halogen selected from the group consisting of Cl, Br and I, and i and j are mole fractions and satisfy the following relationships;

$i + j = 1$ $0 < i \leq 1$ $0 \leq j < 0.8;$ with at least one monomeric polyamine (ii) which is a non-cyclic or cyclic polyamine containing;
(1) from 0 to 1 amino group,
(2) more than 1 imino group, and
(3) the sum of the amino group and the imino groups is more than 2, wherein the amino group when present is bonded to a carbon atom and the imino groups are bonded to from one to two carbon atoms, the total number of the carbon atoms being from 3 to 12.

25. The process defined in claim 24, wherein the monomeric polyamine (II) is 4-(aminomethyl)piperidine.

26. The process defined in claim 24, wherein the epihalohydrin (I) is selected from the group consisting of polyepichlorohydrin, polyepibromohydrin and polyepiiodohdrin.

27. The process defined in claim 20, wherein the monomer is selected from the group consisting of phenylenediamine, diaminodiphenylether, diaminodiphenylsulfone, diaminodiphenylmethane and tetraaminodiphenylmethane.

28. The process defined in claim 20, wherein said monomer is phenylenediamine.

29. The process defined in claim 20, wherein said monomer is m-phenylenediamine.

30. The process defined in claim 20, wherein said crosslinking agent is selected from the group consisting of trimesoylchloride and trimellitic acid chloride.

31. The process defined in claim 20, wherein said crosslinking agent is trimesoylchloride.

32. The process defined in claim 20, wherein said microporous substrate comprises an organic polymer selected from the group consisting of polysulfone, chlorinated polysulfone, cellulose acetate and polyvinylchloride.

33. The process defined in claim 20, wherein said microporous substrate comprises polysulfone.

34. The process defined in claim 20, wherein said microporous substrate is reinforced by a material selected from the group consisting of calendered woven fabric, calendered non-woven fabric, uncalendered woven fabric, uncalendered non-woven fabric, porous film and paper.

35. The process defined in claim 20, wherein the membrane is protected by a crosslinked polymer selected from the group consisting of polyvinyl alcohol, partially saponified polyvinyl acetate and polyvinylpyrrolidone.

36. The process defined in claim 20, wherein the mixture contains from about 10% to about 90% by weight of the water soluble polymer and about 90% to 10% by weight of the monomer.

37. The process defined in claim 20, wherein the concentration of the aqueous solution is in the range of about 0.1% to 10% by weight.

* * * * *